US012565850B2

(12) United States Patent
Bellato et al.

(10) Patent No.: US 12,565,850 B2
(45) Date of Patent: Mar. 3, 2026

(54) PRE-CHAMBER IGNITION SYSTEM AND PROCEDURE FOR AN INTERNAL COMBUSTION ENGINE

(71) Applicant: MARELLI EUROPE S.P.A., Corbetta (IT)

(72) Inventors: Nazario Bellato, Corbetta (IT); Daniele De Vita, Corbetta (IT); Guilherme Alegre, Corbetta (IT); Matteo De Cesare, Corbetta (IT); Federico Stola, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 76 days.

(21) Appl. No.: 18/259,103

(22) PCT Filed: Feb. 9, 2022

(86) PCT No.: PCT/IB2022/051141
§ 371 (c)(1),
(2) Date: Jun. 23, 2023

(87) PCT Pub. No.: WO2022/180469
PCT Pub. Date: Sep. 1, 2022

(65) Prior Publication Data

US 2024/0052772 A1 Feb. 15, 2024

(30) Foreign Application Priority Data

Feb. 24, 2021 (IT) ........................ 102021000004292

(51) Int. Cl.

*F02B 19/10* (2006.01)
*F02P 23/04* (2006.01)
*F02B 19/12* (2006.01)

(52) U.S. Cl.
CPC ........ *F02B 19/108* (2013.01); *F02B 19/1004* (2013.01); *F02P 23/045* (2013.01); *F02B 19/12* (2013.01)

(58) Field of Classification Search
CPC ...................... F02B 19/108; F02B 19/191004; F02B 19/12; F02P 23/045; F02P 3/00;
(Continued)

(56) References Cited

U.S. PATENT DOCUMENTS 4,499,872 A * 2/1985 Ward ...................... F02B 23/08 123/638
9,771,919 B2 9/2017 Kim et al.
9,920,738 B2 * 3/2018 Gallatz ...................... F02F 1/24
9,957,947 B2 * 5/2018 Gallatz ................. F02P 23/045
9,964,094 B2 * 5/2018 Gallatz ................. F02F 7/0087
(Continued)

FOREIGN PATENT DOCUMENTS

JP 58217760 A * 12/1983
JP 2009036068 A 2/2009
(Continued)

OTHER PUBLICATIONS

Machine translation, JP2009036068A, assigned to Nissan Motor, obtained from https://worldwide.espacenet.com/, pp. 1-10.*
(Continued)

*Primary Examiner* — Grant Moubry
(74) *Attorney, Agent, or Firm* — Howard & Howard Attorneys PLLC

(57) ABSTRACT

A pre-chamber ignition apparatus for an internal combustion engine comprising an apparatus body associable with the cylinder head of an internal combustion engine for communicating with a combustion chamber of the cylinder head through at least one connection hole, a microwave ignition device for generating microwaves to cause ignition of an air/fuel mixture in a pre-chamber formed within the apparatus body. The apparatus body comprises an upstream portion configured to allow the housing and fixing of the
(Continued)

microwave ignition device and a hollow downstream or head portion, delimiting the pre-chamber, in fluid communication with the combustion chamber. The downstream portion is provided with at least one connection hole. The hollow downstream portion includes a reflection wall opposite the microwave ignition device and shaped to receive and concentrate microwaves generated by the microwave ignition device and/or a resonance cavity for the mixture contained in the pre-chamber thereby amplifying the combustion in the pre-chamber.

24 Claims, 7 Drawing Sheets

(58) Field of Classification Search
CPC .......... F02P 9/007; F02P 15/006; F02P 13/00; Y02T 10/12; H01T 13/54
See application file for complete search history.

(56) References Cited

U.S. PATENT DOCUMENTS

| | | | | |
|---|---|---|---|---|
| 10,557,452 | B2 * | 2/2020 | Gallatz | F02P 23/045 |
| 2017/0009730 | A1 | 1/2017 | Kim et al. | |
| 2021/0254543 | A1 * | 8/2021 | Rabhi | F02B 19/02 |

FOREIGN PATENT DOCUMENTS

| | | | |
|---|---|---|---|
| JP | 2012127286 | A | 7/2012 |
| WO | 2017093598 | A1 | 6/2017 |

OTHER PUBLICATIONS

Search Report for Italian Patent Application No. 202100004292 dated Oct. 25, 2021.
International Search Report and Written Opinion of the International Searching Authority for PCT International Patent Application No. PCT/IB2022/051141 mailed May 20, 2022.

* cited by examiner

PRE-CHAMBER IGNITION SYSTEM AND PROCEDURE FOR AN INTERNAL COMBUSTION ENGINE

CROSS-REFERENCE TO RELATED APPLICATIONS

The present application is a National Stage of International Patent Application No. PCT/IB2022/051141, filed on Feb. 9, 2022, which claims priority to and all the benefits of Italian Patent Application No. 102021000004292, filed on Feb. 24, 2021, the entire contents of which are hereby expressly incorporated herein by reference.

BACKGROUND OF THE INVENTION

1. Field of the Invention

This invention relates to a pre-chamber ignition apparatus and method for an internal combustion engine and a related internal combustion engine.

2. Description of the Related Art

In the field of internal combustion engines, pre-chamber ignition is now well known and represents a promising technology adopted on new engines recently launched in production or currently under development by various manufacturers.

The passive pre-chamber is the simplest way to implement this technology, and its main advantage resides in the increase of the combustion speed inside the combustion chamber, which is useful to prevent detonation phenomena. This means that higher compression ratios with respect to the known solutions could be adopted, increasing overall engine efficiency.

However, the passive pre-chamber usually suffers from higher heat losses, which may be particularly significant at low engine loads; in addition, passive pre-chamber technology suffers from poor cold start capacity and erratic operation under low engine load conditions.

In addition, it is known that lean and ultra-lean combustion may significantly increase the efficiency of internal combustion engines. The main restriction in implementing lean and ultra-lean combustion is the poor ignition quality of the air/fuel mixture. High efficiency engines may require the ability to ignite a mixture under conditions wherein the current spark ignition systems are insufficient. It has long been known that, up to certain engine operating conditions, diluting the fuel-air mixture with excess air (lean combustion) or recirculating the exhaust gases (via EGR valve) increases the engine combustion efficiency and reduces emissions. It is also well documented that further dilution ends up destabilizing the combustion in such a way that cycle-to-cycle combustion variations make engine operation extremely erratic.

By adding the pre-chamber, it is possible to burn a small portion of the mixture that is fluidly connected to the main chamber via a plurality of small orifices. The high-energy products of this pre-chamber combustion are then transferred to the main chamber through said orifices so as to ignite the air-fuel load contained in the main combustion chamber.

However, the pre-chamber also suffers from poor flammability due to the high dilution of the mixture it contains; therefore, it is known to use an active system with an additional GDI injector to adjust the stoichiometric ratio in the pre-chamber by injecting the fuel directly into the pre-chamber: in this way, however, the overall cost of the ignition apparatus is increased.

Additional disadvantages of pre-chamber ignition include poor flammability when the engine and pre-chamber are cold, even with active systems, which suffer also from the formation of a fuel film on the wall of the pre-chamber due to liquid fuel injection. Usually, a dual ignition system is used to overcome the problem, comprising a standard spark plug in the combustion chamber and an additional spark plug placed in the pre-chamber.

Lastly, a high mixture dilution via exhaust gas recirculation (EGR) is detrimental to the ignition in the pre-chamber with a conventional spark plug, due to the lack (or scarcity) of oxygen, even if an active layout is used.

To overcome this problem, it is known to use a very complex air-fuel mixture injector inside the pre-chamber, which is equipped with an additional electric air compressor; this, however, involves a high cost and an overall pressure limitation.

SUMMARY OF THE INVENTION

There is therefore a need to solve the drawbacks and limitations mentioned with reference to the related art.

This need is satisfied by a pre-chamber ignition apparatus for an internal combustion engine comprising an apparatus body associable with the cylinder head of an internal combustion engine so as to be in fluid communication with a combustion chamber of said cylinder head through at least one connection hole. The apparatus also includes a microwave ignition device, equipped with an antenna configured to generate microwaves suitable to ignite an air/fuel mixture in a pre-chamber inside the housing. The apparatus body comprises an upstream portion configured to allow the housing and fixing of the microwave ignition device and a hollow downstream or head portion delimiting the pre-chamber, in fluid communication with the combustion chamber of the cylinder head of the engine. The downstream portion is provided with the at least one connection hole, wherein the hollow downstream portion includes a reflection wall opposite the microwave ignition device and shaped to receive and concentrate the microwaves generated by the latter and/or a resonance cavity for the mixture contained in the pre-chamber thereby amplifying the pre-chamber combustion. The present invention is also directed to a pre-chamber ignition method comprising the step of providing a pre-chamber ignition apparatus as described above and activating combustion using a microwave ignition device and/or a plasma ignition device.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
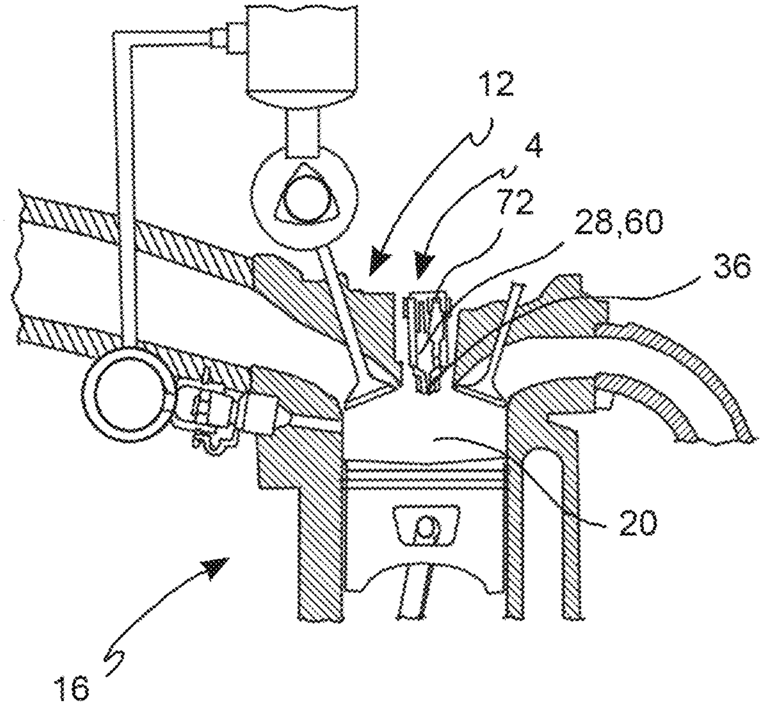
FIG. 1 is a cross-sectional view of an internal combustion engine comprising a pre-chamber ignition apparatus according to an embodiment of this invention.
Figure 3:
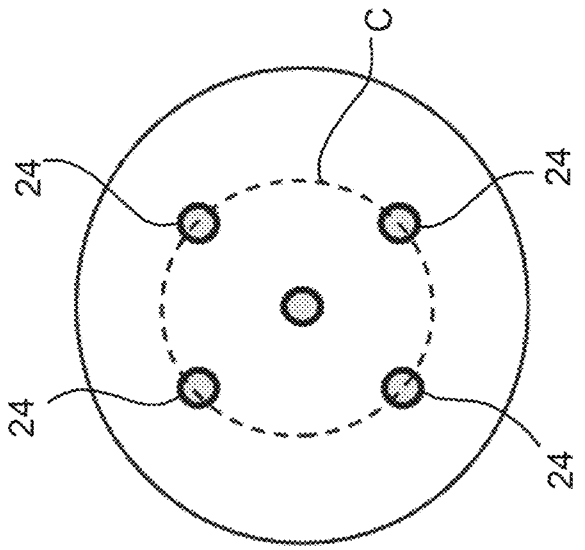
FIG. 3 is a bottom view, from the side of the arrow III in FIG. 2 of the pre-chamber ignition apparatus in FIG. 2.
Figure 2:
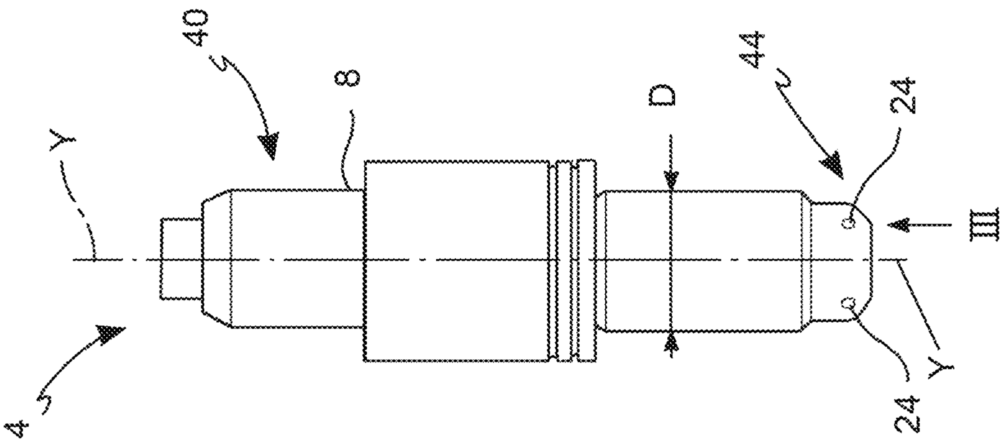
FIG. 2 represents a perspective view of a pre-chamber ignition apparatus according to a second embodiment of this invention.
Figure 4:
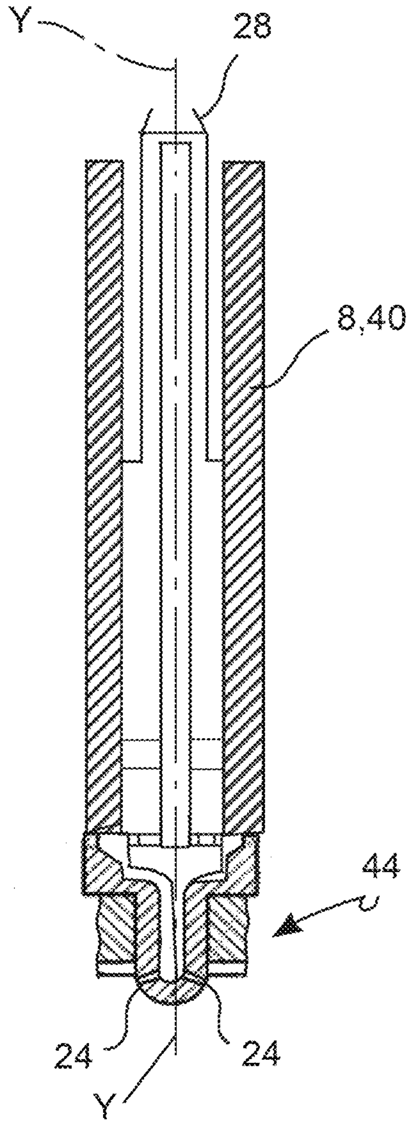
FIG. 4 is a cross-sectional view of a passive pre-chamber ignition apparatus according to this invention.
Figures 5, 6, 7, 8:
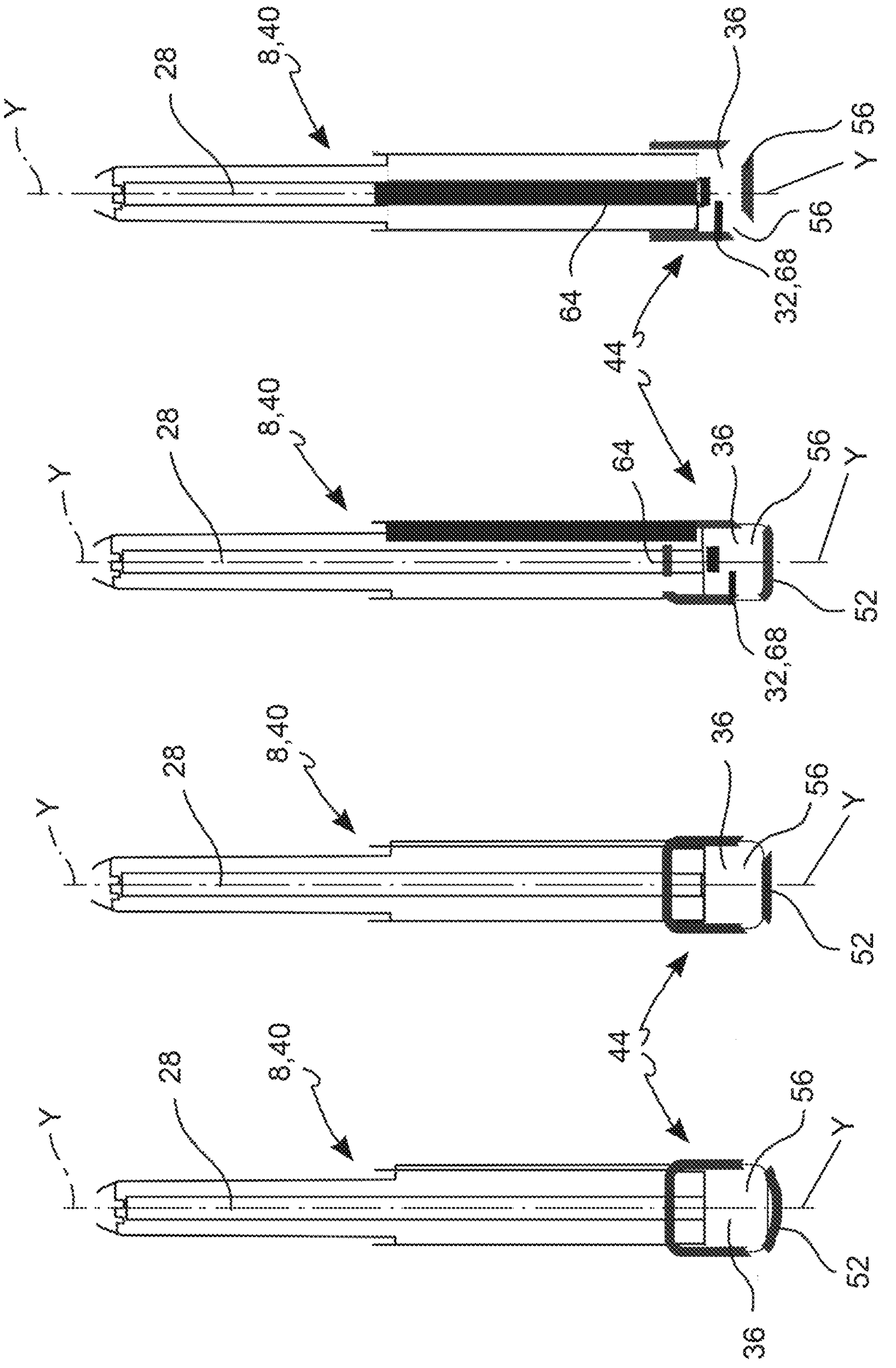
FIGS. 5-8 are sectional views of variant embodiments of the passive pre-chamber ignition apparatus shown in FIG. 4.
Figure 9:
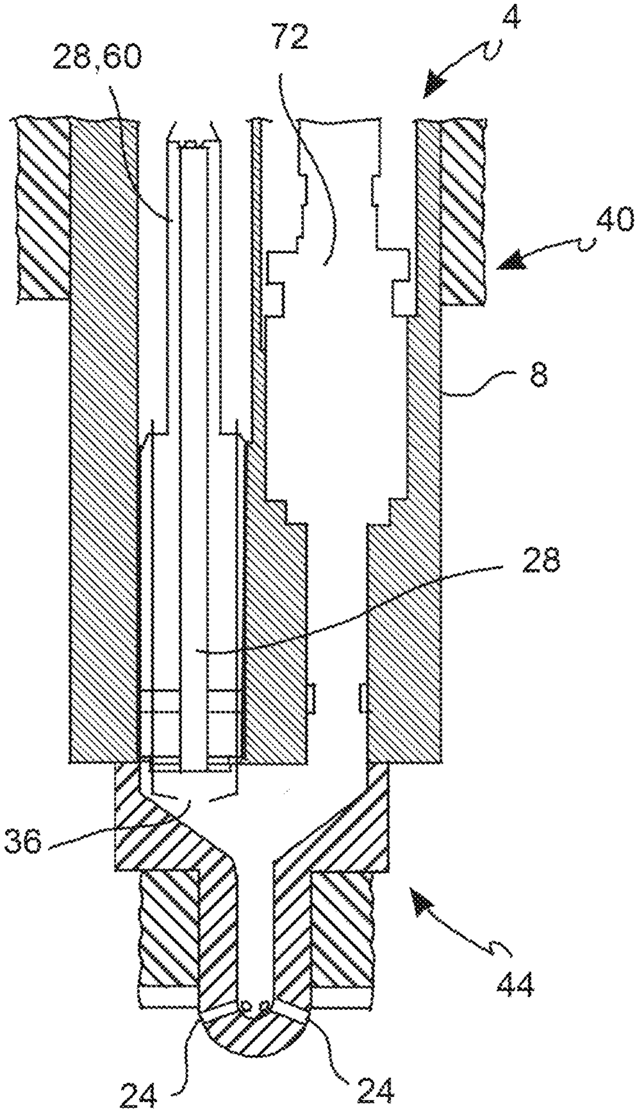
FIG. 9 is a cross-sectional view of an active pre-chamber ignition apparatus according to this invention.
Figures 10, 11, 12, 13:
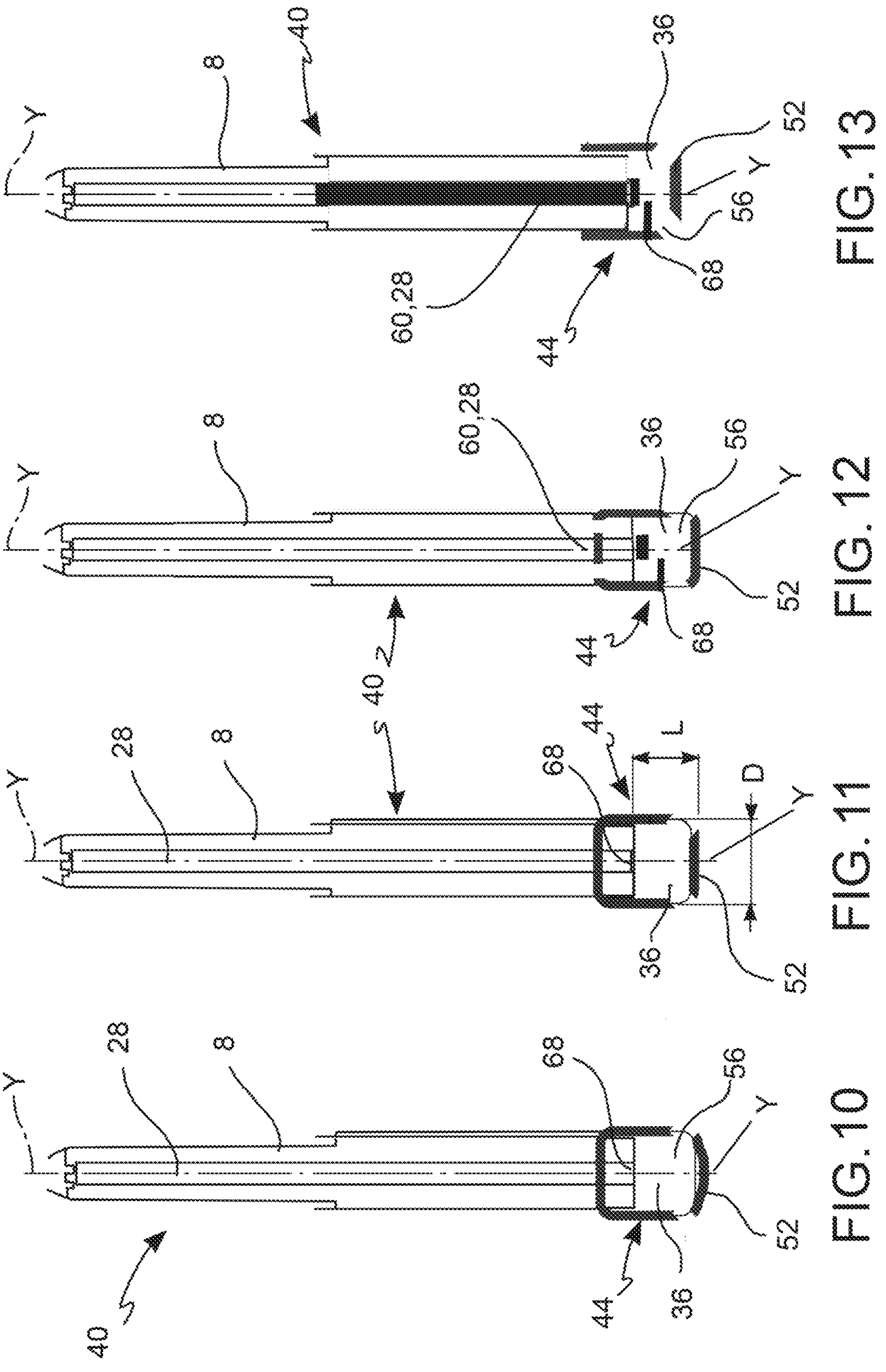
FIGS. 10-13 are cross-sectional views of variant embodiments of the active pre-chamber ignition apparatus shown in FIG. 9.
Figure 14:
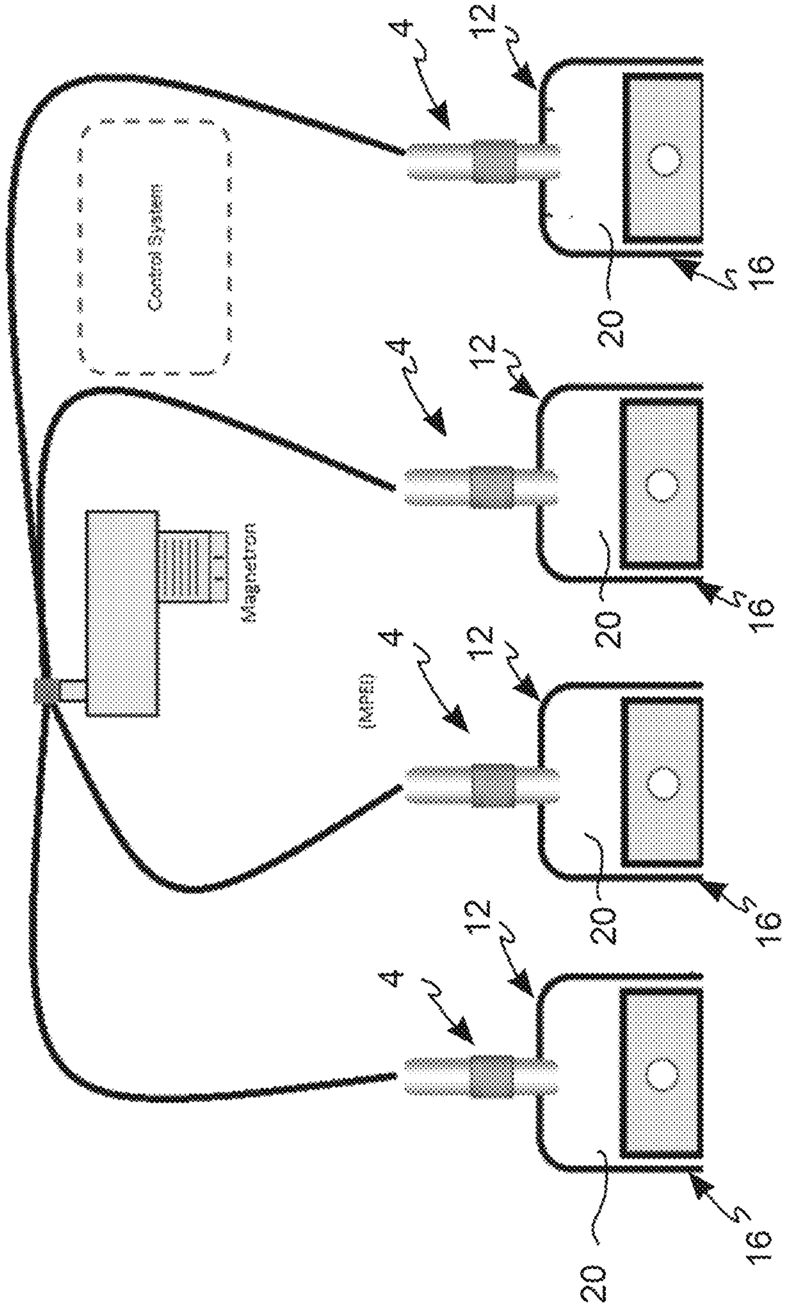
FIG. 14 is a schematic view of an engine provided with a fuel system and a pre-chamber ignition apparatus according to this invention.

As described above, the lack of flammability of the highly diluted or 'lean' air/fuel mixture and the increased susceptibility to detonation of internal combustion engines with high compression ratios represent barriers to use in standard internal combustion engine solutions.

The pre-chamber and the microwave or microwave-assisted plasma ignition system are, as we shall see, potential tools for extending the operating zone in lean or ultra-lean combustion.

In particular, this invention considers two possible macro-solutions: the use of an enhanced passive pre-chamber, with an enhanced microwave ignition system and no fuel injector, the use of an active pre-chamber system, with an enhanced microwave ignition system and a simplified fuel injector with respect to the most advanced solutions of the related art.

With reference to the aforesaid figures, an overall schematic view of a pre-chamber ignition apparatus for an internal combustion engine according to this invention has been indicated collectively with 4.

The pre-chamber ignition apparatus 4 comprises an apparatus body 8 associable with the cylinder head 12 of an internal combustion engine 16 so as to be in fluid communication with a combustion chamber 20 of the cylinder head 12 through at least one connection hole 24.

The pre-chamber ignition apparatus 4 further comprises a microwave ignition device 28 having an antenna 32 configured to generate microwaves adapted to cause the ignition of an air/fuel mixture in a pre-chamber 36 formed within the apparatus body 8.

In one embodiment, the apparatus body 8 has a cylindrical configuration extending along a prevailing extension axis Y-Y; preferably the apparatus body 8 is axisymmetric with respect to said prevailing extension axis Y-Y.

The apparatus body 8 comprises an upstream portion 40 configured to allow the housing and attachment of the microwave ignition device 28, and a hollow downstream or head portion 44, delimiting said pre-chamber 36, associable in fluid communication with the combustion chamber 20 of the cylinder head 12 of the internal combustion engine 16. For this purpose, the downstream or head portion 44 is provided with said at least one connection hole 24.

In one embodiment, the volume of the pre-chamber 36 is less than 2% of the volume of the combustion chamber 20 of the cylinder head 12 when the piston is at top dead center: in this way, the propagation of the combustion flame may be adequately supported.

The downstream or head portion 44 of the apparatus body 8 terminates in a cylindrical nose having a radius of curvature preferably not less than 10% of the diameter D of said downstream portion 44.

In one embodiment, the downstream or head portion 44 of the apparatus body 8 has a plurality of connection holes 24 arranged along a circumference C having a diameter of no more than 60% of the diameter D of the downstream portion 44 thereof.

According to a possible embodiment, the downstream portion 44 of the apparatus body 8 comprises 4 to 8 connection holes 24; due to this feature, the risk of cavitation may be minimized, and the plasma flow may be better distributed.

The connection holes 24 may have a diameter of 0.9 to 1.3 mm: such values of the diameter of the connection hole 24 are optimized to prevent the flame of the combustion from extinguishing; the optimization of the orifice diameter and its number is important for improving flame propagation without increasing heat loss.

In one embodiment, the ratio L/D, wherein 'L,' is the length of the downstream portion 44 and 'D' is the diameter of the downstream portion 44, is less than or equal to 0.4.

Due to these dimensional arrangements, it is possible to minimize cavitation.

In one embodiment, the length L of the downstream portion 44 delimiting the pre-chamber 36 is equal to the fuel resonance frequency fr (GHz) or integer multiples thereof (and is varied according to the fuel used in the internal combustion engine).

Advantageously, the hollow downstream or head portion 44 may include a reflection wall 52 opposite the microwave ignition device 28 and shaped to receive and concentrate microwaves generated by the microwave ignition device and/or may comprise a resonance cavity 56 for the mixture contained in the pre-chamber 36 thereby for amplifying the pre-chamber combustion 36.

To this end, the reflection wall 52 is concave towards the microwave ignition device 28.

In one embodiment, the reflection wall 52 is adjacent to a plurality of connection holes obtained on the downstream portion 44 of the apparatus body 8 to place the pre-chamber 36 in fluid communication with the cylinder head 12 of the engine 16.

According to one possible embodiment, a plasma ignition device 60 is provided with a related electrode within the pre-chamber 36.

The plasma ignition device 60 may be integrated with the microwave ignition device 28.

Similarly, the plasma ignition device 60 and/or the microwave ignition device 28 may be integrated into the apparatus body 8.

According to one possible embodiment, the microwave ignition device 28 has a flat antenna 68. The microwave ignition device 28 may comprise an antenna 68 coincident with the electrode 64 of the plasma ignition device 60.

As mentioned above, the pre-chamber ignition apparatus 4 may comprise an active pre-chamber 36, i.e., provided with at least one fuel injector 72 within the pre-chamber.

The fuel injector 72 may be integrated into the apparatus body 8.

The fuel injector 72 may include a solenoid injector and a single-hole injector.

In one embodiment, the fuel injector 72 is a low static fluid injector, i.e., with a low flow rate when totally open (needle at full stroke).

According to another possible embodiment, the fuel injector 72 has an outer diameter at the end of the injector of less than 6 mm and/or an overall length of between 50 mm and 70 mm.

The solenoid injector is the most suitable type for an active pre-chamber layout.

A standard GDI injector may be simplified to be integrated into the pre-chamber 36, tailoring the design to the active injection needs of the pre-chamber 36 (typically single-hole, with low static flow for small amounts of injected fuel). This allows for a smaller size and a reduced cost with respect to the typical GDI injector in the main chamber, used in the prior art.

Additional advantages of the proposed microwave ignition system (MPEI) are, as shown, the possibility of lean combustion in the pre-chamber 36, with reduced injected amount and less stringent injection accuracy requirements, further simplifying the design of the fuel injector 72.

The operation of a pre-chamber injection apparatus according to this invention will now be described.

As shown, microwave-plasma or microwave ignition systems are advanced ignition technologies that reliably extend the operating range of the pre-chamber in internal combustion engines.

In the first solution (microwave-plasma), a plasma arc is used in addition to microwaves to ignite the mixture inside the pre-chamber. In this solution, the microwave ignition device 28 and the plasma ignition device 60 are used. Alternatively, it is possible to use only the microwave ignition device 28.

The plasma arc for the first flame core and the microwaves may be generated by a single integrated device, such as the magnetron, or the source for the microwaves may be an integrated device within the control unit. In this case, preferably the plasma arc is generated with a coil according to the state of the art. The microwaves are generated at an optimal fuel resonance frequency (on the order of GHz), activating the combustion of the air/fuel mixture in the pre-chamber.

Upon ignition, the plasma arc is activated by the plasma ignition device 60 to generate the combustion core. At the same time, the microwave generator device 28 is activated to accelerate and stabilize the combustion already initiated in the pre-chamber 36.

Using a coaxial cable, the magnetron may be placed some distance from the engine and supply all the ignition devices of the cylinders. This allows the use of commercially available magnetrons.

The percentage of fuel injected into the pre-chamber 36 may be about 2-3% of the total fuel injection per cycle. The amount of fuel injected into the pre-chamber 36 must be calibrated in the engine control module according to an appropriate strategy (e.g., as a function of the engine speed and load, main chamber, etc.).

A proper balance between the penetration of the jet flame, the diameter of the connection holes 24, and the number of connection holes 24 allows for the optimized ignition of the mixture in the main combustion chamber 20 of the cylinder head 12 of the internal combustion engine 16.

In the case of an active pre-chamber system, this system uses a combination of a GDI or PFI fuel injector in the main combustion chamber 20 and a solenoid-operated fuel injector 72 to dose the gasoline/air mixture into the pre-chamber 36.

Further, the fuel supply circuit receives fuel from the fuel system and distributes it to the fuel injectors. It is important for the fuel to be available at the required pressure at the start of the injection and that there are no pressure fluctuations between individual injections.

In order to be integrated into existing engines, the system is powered by a flexible fuel circuit (rail).

Opening and closing the fuel injectors create pressure pulses in the fuel rail that may lead to unstable fuel pressure. In order to achieve a precise and constant pressure in the fuel circuit (rail), the flexible fuel rail (rubbery materials with reinforcing metal mesh or metal materials) is used.

Gasoline, ethanol, methanol, methane, LPG, CH4/H2 blends, and alternative fuels such as E-fuel may all be used if an active pre-chamber is used.

The ignition of the air/fuel mixture in the pre-chamber 36 occurs with an air/fuel ratio in the range of 0.95 to 1.7; in the case of an active pre-chamber 36, i.e., one equipped with a fuel injector 72, ignition may occur in the pre-chamber 36 with a titer up to a value of 2.6.

In one embodiment, in active configurations, the fuel is injected into the pre-chamber 36 at a pressure less than or equal to 150 bar.

The pre-chamber ignition apparatus 4 according to the invention is provided with a processing and control unit for managing its operation. The processing and control unit comprises a solid state chip for generating microwaves.

The pre-chamber system with microwave or microwave-assisted ignition is managed by the electronic control unit, typically the same one that controls all the engine functions. The main functions required to control this system, in the case of a passive pre-chamber system, comprise controlling the plasma ignition (angular phase of the spark, spark actuation), controlling the microwave system (angular phase and duration of the microwave pulses). The ECU (electronic control unit) may directly integrate the solid state chip that generates the microwaves and manages the related control.

The main functions required for controlling this system, in the case of an active pre-chamber system, comprise controlling the plasma ignition (angular phase of the spark, spark actuation), controlling the microwave system (phase and duration of the microwave pulses), managing the amount of fuel injected and the angular injection phase of the fuel injector in the pre-chamber. The ECU (electronic control unit) may directly integrate the solid state chip that generates the microwaves and manages the related control.

With regard to systems with microwave-assisted plasma pre-chamber ignition, the ion sensing technology (ionization current reading) acquired by the ECU through a dedicated circuit integrated with the spark plug is used to detect the ignition of the mixture and then check the actual combustion.

As may be appreciated from the above, this invention overcomes the disadvantages of the prior art.

The advantage of the increased flammability within the pre-chamber given by the apparatus according to this invention is able to simplify the current systems. Depending on the specific engine, the pre-chamber may support lean mixture operation of the engine while employing a passive system. The active pre-chamber provided with a simplified injector may be adopted in order to have a more flexible and easy-to-install system, even in pre-existing architectures, without requiring the redesign of the cylinder head of an internal combustion engine and a second spark plug is no longer required for cold ignition with low engine load, as is the case with the known solutions.

In general, the pre-chamber ignition apparatus according to this invention effectively uses the combination of a plasma arc and microwaves as an intense and stable ignition source in a gasoline engine, even under lean and ultra-lean mixture conditions in the pre-chamber combustion process.

Further, this invention has a variety of industrial applications, such as port fuel injection (PFI) and direct injection engine (GDI), flex-fuel (FF) in conventional and hybrid vehicles.

The solution is also cost-effective, since the microwave source may be a carry-over of the magnetron used for home microwave ovens. This keeps the cost of the main component low. Further, microwaves may be generated with a solid-state chip that may be integrated into the processing and control unit (electronic control unit—ECU).

In the case of ignition based on microwaves and plasma (spark plug), the two electrical circuits of the ignition sources may be integrated in turn.

Advantageously, the proposed microwave ignition system (MPEI) allows for working with lean combustion within the pre-chamber, with reduced amounts of fuel injected and therefore less stringent injection accuracy requirements: in this way the design of the injector is further simplified.

Further, the microwave ignition system (MPEI) may be applied to existing engine systems without changing their architectures. The lower costs and ease of installation also make it suitable for smaller layouts available on existing architectures.

A person skilled in the art, in order to satisfy contingent and specific needs, may make numerous modifications and variations to the solutions described above, the modifications and variations all being contained within the scope of the invention as defined in the following claims.

The invention claimed is:

1. A pre-chamber ignition apparatus for an internal combustion engine comprising:
- a pre-chamber having at least one solenoid fuel injector disposed inside the pre-chamber,
- an apparatus body associated with a cylinder head of the internal combustion engine so as to be in fluid communication with a combustion chamber of said cylinder head through at least one connection hole,
- a microwave ignition device, equipped with an antenna configured to generate microwaves suitable to ignite an air/fuel mixture in the pre-chamber inside said body,
- wherein the apparatus body comprises an upstream portion configured to allow the housing and fixing of said microwave ignition device and a hollow downstream portion delimiting said pre-chamber, in fluid communication with the combustion chamber of said cylinder head of the engine, the downstream portion being provided with said at least one connection hole,
- wherein the hollow downstream portion includes a reflection wall opposite the microwave ignition device and shaped to receive and concentrate the microwaves generated by the microwave ignition device for the mixture contained in the pre-chamber thereby amplifying the pre-chamber combustion.

2. The pre-chamber ignition apparatus for the internal combustion engine as set forth in claim 1, wherein said reflection wall is concave towards the microwave ignition device.

3. The pre-chamber ignition apparatus for the internal combustion engine as set forth in claim 1, wherein said reflection wall is adjacent to a plurality of connection holes made on the downstream portion of the apparatus body to place the pre-chamber in fluid communication with the cylinder head of the engine.

4. The pre-chamber ignition apparatus for the internal combustion engine as set forth in claim 1, comprising a plasma ignition device provided with a related electrode inside said pre-chamber.

5. The pre-chamber ignition apparatus for the internal combustion engine as set forth in claim 4, wherein said plasma ignition device is integrated with said microwave ignition device.

6. The pre-chamber ignition apparatus for the internal combustion engine as set forth in claim 4, wherein the plasma ignition device and/or the microwave ignition device are integrated into the apparatus body.

7. The pre-chamber ignition apparatus for the internal combustion engine as set forth in claim 4, wherein the microwave ignition device has an antenna coinciding with an electrode of the plasma ignition device.

8. A control unit for managing a pre-chamber ignition apparatus as set forth in claim 4, programmed to manage, in the case of a passive pre-chamber system, activation of the plasma ignition device or activation of the microwave ignition device.

9. The control unit as set forth in claim 8, comprising a solid-state chip for generating microwaves.

10. A control unit for managing a pre-chamber ignition apparatus as set forth in claim 4, programmed to manage, in the case of an active pre-chamber system, activation of the plasma ignition device, activation of the microwave ignition device, management of the amount of fuel injected by the fuel injector and the angular phase of injection of the fuel injector into the pre-chamber.

11. The pre-chamber ignition apparatus for the internal combustion engine as set forth in claim 1, wherein the microwave ignition device has a flat antenna.

12. The pre-chamber ignition apparatus for the internal combustion engine as set forth in claim 1, wherein the volume of the pre-chamber is less than 2% of the volume of the combustion chamber of said cylinder head when a piston is at top dead center.

13. The pre-chamber ignition apparatus for the internal combustion engine as set forth in claim 1, wherein the downstream portion of the apparatus body terminates in a cylindrical nose having a radius of curvature of not less than 10% of the diameter (D) of said downstream portion.

14. The pre-chamber ignition apparatus (4) for the internal combustion engine as set forth in claim 1, wherein the downstream portion of the apparatus body has a plurality of connection holes arranged along a circumference (C) having a diameter not exceeding 60% of the diameter (D) of said downstream portion.

15. The pre-chamber ignition apparatus for the internal combustion engine as set forth in claim 14, wherein said connection holes have a diameter of 0.9 to 1.3 mm.

16. The pre-chamber ignition apparatus for the internal combustion engine as set forth in claim 1, wherein the downstream portion of the apparatus body comprises 4 to 8 connection holes.

17. The pre-chamber ignition apparatus for the internal combustion engine as set forth in claim 1, wherein the ratio L/D, where 'L' is the length of the downstream portion and 'D' is the diameter of said downstream portion, is less than or equal to 0.4.

18. The pre-chamber ignition apparatus for the internal combustion engine as set forth in claim 17, where the length L of the downstream portion delimiting the pre-chamber is equal to a fuel resonance frequency (GHz) or integer multiples thereof.

19. The pre-chamber ignition apparatus for the internal combustion engine as set forth in claim 1, wherein said fuel injector is integrated into the apparatus body.

20. The pre-chamber ignition apparatus for the internal combustion engine as set forth in claim 1, wherein said fuel injector has an outer diameter at the end of the injector of less than 6 mm and/or an overall length between 50 mm and 70 mm.

21. A method of igniting an air/fuel mixture in a pre-chamber ignition apparatus, comprising the step of providing a pre-chamber ignition apparatus as set forth in claim 1 and activating combustion using the microwave ignition device and/or a plasma ignition device.

22. The method of igniting an air/fuel mixture in a pre-chamber ignition apparatus as set forth in claim 21, wherein the ignition of the air/fuel mixture in the pre-chamber occurs at an air/fuel ratio in a range from 0.95 up to 1.7.

23. The method of igniting an air/fuel mixture in a pre-chamber ignition apparatus as set forth in claim 21, comprising the step of providing at least one fuel injector inside the pre-chamber and injecting the fuel into the pre-chamber at a pressure of 150 bar or less by said at least one fuel injector, so that ignition occurs in the pre-chamber with a titer up to a value of 2.6.

24. An internal combustion engine comprising a pre-chamber ignition apparatus as set forth in claim 1.

* * * * *